June 12, 1962  J. KANCEPOLSKY  3,038,376
SPECTACLE FRAME AND SUPPORT THEREFOR
Filed Feb. 2, 1960

INVENTOR
JOSEPH KANCEPOLSKY
BY
ATTORNEY

United States Patent Office 3,038,376
Patented June 12, 1962

3,038,376
SPECTACLE FRAME AND SUPPORT THEREFOR
Joseph Kancepolsky, 3094 Brighton 5th St.,
Brooklyn 35, N.Y.
Filed Feb. 2, 1960, Ser. No. 6,296
1 Claim. (Cl. 88—51)

This invention relates to a spectacle frame and support therefor adapted especially for use by ladies.

It is the object of the present invention to provide a spectacle frame which affords maximum comfort and esthetic appeal, for use by women.

It is another object of the present invention to provide a spectacle frame which eliminates discomfort and pressure indentations normally caused by the spectacle bridge extending between the lens frames, which is supported on the bridge of the nose through the intermediary of nose pads. At the same time, a positive retention of the spectacle frame on the head of the wearer is assured, with no discomfort at the ears or at any other portions of the head. In addition, the support for the spectacle frame enhances the ornamental appearance at the back of the wearer's head while de-emphasizing the appearance of the spectacle frame on the face of the wearer.

It is a further object of the invention to provide a spectacle frame of rugged and economical construction which permits the support therefore to be adjusted to obtain maximum comfort together with secure retention despite variations in the size of the wearer's head or differences in hair coiffures.

Other objects and purposes will appear from the detailed description of the invention following hereinafter, taken in conjunction with the accompanying drawing, wherein—

Figure 1:
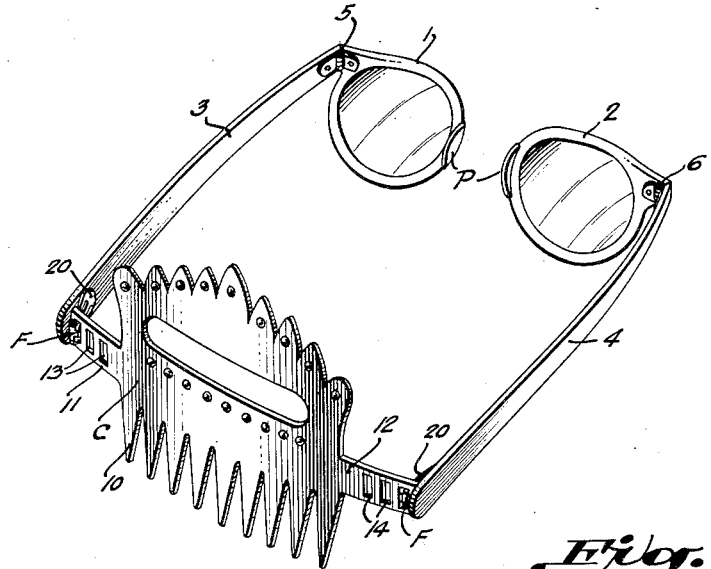
FIG. 1 is a perspective view of the spectacle frame and support therefor in accordance with the present invention.
Figure 2:
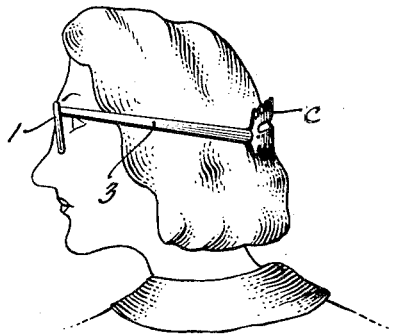
FIG. 2 is a side view of the spectacle frame as adapted for feminine use.

In the drawing is shown a spectacle frame composed of frames 1 and 2 for the left and right lenses, respectively, which may be formed of metal, plastic or any other materials used in the manufacture of spectacle frames. These may be plain or ornamented on the front faces, as is conventional in the art.

Temples 3 and 4 of flat material are pivotally connected at their forward ends to the lens frames 1 and 2, respectively, by means of tight hinges 5 and 6. These hinges, of necessity, must be tight in order to permit the intentional folding of the lens frames adjacent to the temples, but to maintain them rigidly in extended position transversely of the temples in front of the eyes of the wearer while in use. This is possible without benefit of a bridge extending between the lens frames, which normally is supported upon the bridge of the nose. The elimination of the spectacle bridge serves to de-emphasize the fact that spectacles are being worn, which serves as an inducement for the wearing of such by persons who have an acute need for them, but who are conscious of their appearance with the spectacles in place.

If desired, the inner ends of the spectacle frames may be provided with nose pads P to limit the inward movement of the lenses towards the eyes. However, these nose pads do not exert pressure, nor do they cause any indentations on the lateral sides of the nose, as is the case when such nose pads are associated with a central supporting spectacle bridge.

In order to provide adequate support for the spectacle frame despite the elimination of the spectacle bridge from between the lens frames, an ornamental comb C is adapted for wear at the back of the head. This comb of substantially flat material, having teeth 10, may be of any desired contour and may be provided with any ornamentation such as rhinestones or other precious or semi-precious stones.

The comb C may be provided with lateral extensions 11 and 12 extending from the opposite sides thereof, and rectangular openings 13 and 14, respectively, are provided in these extensions at displaced points therealong.

Figure 3:
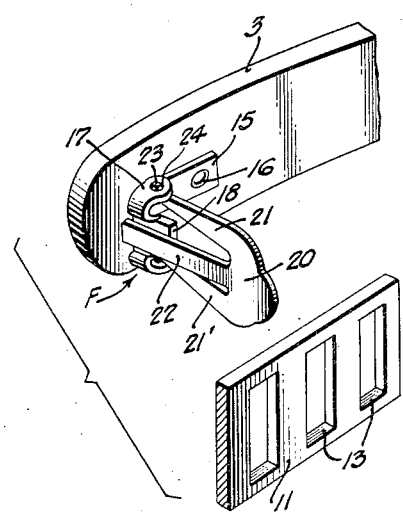
FIG. 3 is a perspective view, on an enlarged scale, showing the preparatory interengagement of the left temple of the spectacle frame with the extension of the supporting comb shown in FIG. 1.

Pivoted fasteners F of flat sheet-metal are affixed to the inner face of each temple adjacent to the rear end thereof. As shown in FIG. 3, a fixed arm 15 of the fastener is affixed in any suitable manner to the inner wall of the temple 3, for example, by means of rivets 16. Ears 17 extend transversely from the arm 15 on the opposite sides of a fulcrum plate 18 also extending transversely from the attaching plate 15. A pivoted tongue or lever 20, having bifurcated arms 21 and 21' and an intermediate spring arm 22 is provided with outwardly extending trunnions 23 which engage openings 24 in the ears 17 for pivotal movement with respect to the fixed assembly 15—18. The fulcrum bar 18 cooperates with the central spring arm 22 of the pivoted lever to impart a snap action thereto as the same is rotated from a position transverse to the plane of the temple 3 to a position parallel and adjacent to the temple. Thus, the arm 20 is adapted to extend through one of the openings 13 and thereafter the same is swung in a counter-clockwise direction to the position shown in FIG. 1 to detachably secure the end of the lateral projection 11 of the comb C to the temple 3.

A plurality of openings 13 are provided to afford a degree of adjustment for variations in sizes of the head and differences in coiffures, and if the material of the comb is sufficiently flexible, the portion 11 may be bent adjacent to the temple when one of the inner holes 13 or 14 is utilized. On the other hand, once a certain adjustment is made, the ends of lateral projections 11 and 14 may be severed to leave only the opening adjacent the fastener F which affords the maximum comfort and desired fit.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claim.

I claim:

In combination with a bridgeless spectacle frame having a temple of flat material at each side provided with a hinge at the forward end thereof for connection to the outer end of each lens frame, a sheet-metal pivoted lever comprising a spring arm affixed to the inner face of each temple adjacent to the rear end thereof, each pivotal lever being resiliently positioned by spring action between alternate positions adjacent to the inner face of each temple and transverse thereto, a single ornamental comb of substantially flat material and provided with teeth adapted to engage the hair at the rear of the head of a wearer and with a vertical elongated opening at each end of said comb for permitting attachment and detachment of the comb relative to the temples, each opening adapted to receive the respective pivoted lever when the same is in its transverse position for secure interlocking interengagement therewith when each lever is swung into its alternate position by its spring action, thereby to retain the spectacle frame securely in front of the wearer's eyes.

References Cited in the file of this patent

UNITED STATES PATENTS

| | | |
|---|---|---|
| D. 36,628 | Howe | Nov. 17, 1903 |
| D. 129,119 | Halikman | Aug. 26, 1941 |
| D. 171,056 | Schiaparelli | Dec. 8, 1953 |
| 105,957 | Lincoln | Aug. 2, 1870 |
| 182,013 | Andross | Sept. 12, 1876 |
| 1,819,738 | Daniels | Aug. 18, 1931 |
| 2,249,572 | Lieber | July 15, 1941 |
| 2,541,493 | Barroso | Feb. 13, 1951 |
| 2,766,657 | Nathan | Oct. 16, 1956 |

FOREIGN PATENTS

| | | |
|---|---|---|
| 986,716 | France | Apr. 4, 1951 |